United States Patent [19]
McMillan

[11] Patent Number: 5,901,990
[45] Date of Patent: May 11, 1999

[54] TOGGLE LOCKING RELEASE MECHANISM

[76] Inventor: John H. McMillan, 465 N. 45th St., Suite 405, Seattle, Wash. 98103

[21] Appl. No.: 08/709,630

[22] Filed: Sep. 9, 1996

Related U.S. Application Data

[63] Continuation of application No. 08/375,899, Jan. 20, 1995, abandoned.

[51] Int. Cl.$^6$ .................................................. E05C 3/06
[52] U.S. Cl. ............... 292/195; 294/82.33; 292/DIG. 49
[58] Field of Search ............................... 294/82.27, 82.31, 294/82.32, 82.33; 292/195, 196, DIG. 49

[56] References Cited

U.S. PATENT DOCUMENTS

| | | |
|---|---|---|
| 839,036 | 12/1906 | Roberts . |
| 1,435,634 | 11/1922 | Foxhall ................. 294/82.33 |
| 1,524,699 | 2/1925 | Faber .................... 294/82.33 |
| 1,813,294 | 7/1931 | Hunt . |
| 2,024,222 | 12/1935 | Hinchman . |
| 2,327,751 | 8/1943 | Unthank . |
| 2,350,999 | 6/1944 | Beirise . |
| 2,426,099 | 8/1947 | Hershowitz ........... 294/82.32 |
| 2,473,764 | 6/1949 | Park . |
| 2,565,172 | 8/1951 | Firman ................. 294/82.32 |
| 2,595,450 | 5/1952 | Coffing ..................... 294/83 |
| 2,637,088 | 5/1953 | Foster . |
| 2,714,731 | 8/1955 | Binmore . |
| 2,736,599 | 2/1956 | Coffing ..................... 294/83 |
| 3,109,676 | 11/1963 | Mercer . |
| 3,145,040 | 8/1964 | Phelps .................... 292/196 |
| 3,923,333 | 12/1975 | Whaley .................... 294/104 |
| 3,979,803 | 9/1976 | Clarke et al. ........... 24/248 D |
| 4,813,731 | 3/1989 | Smith .................... 294/82.33 |
| 4,850,254 | 7/1989 | Burney ..................... 81/367 |
| 5,002,002 | 3/1991 | Awalt ................. 292/DIG. 49 |
| 5,100,192 | 3/1992 | McMillan ............. 294/82.31 |
| 5,123,374 | 6/1992 | McMillan ................. 114/230 |

FOREIGN PATENT DOCUMENTS

| | | | |
|---|---|---|---|
| 783179 | 11/1980 | U.S.S.R. ................. | 294/82.33 |

Primary Examiner—Rodney M. Lindsey
Assistant Examiner—Gary Estremsky
Attorney, Agent, or Firm—Seed and Berry LLP

[57] ABSTRACT

An improved toggle locking release mechanism (8) is provided, including a connecting body (10), and opposing pivoted jaw (22), and multi-pivoted floating links or movable lock/release links (30) and a movable toggle link/release lever (34). The mechanism of the present invention is adapted to provide a secure locking connection as well as facilitating multi-directional quick releasing while the mechanism (8) is under high-tensile load.

9 Claims, 3 Drawing Sheets

TOGGLE LOCKING RELEASE MECHANISM

This application is a continuation of application No. 08/375,899 filed Jan. 20, 1995, now abandoned.

TECHNICAL FIELD

The present invention pertains to devices for connecting high-tensile loads to objects, and, more specifically, to an improved toggle locking release mechanism that provides a secure locking connection and a quick-releasing means that is operable by a force applied from one of numerous directions.

BACKGROUND OF THE INVENTION

Heretofore, releasable connecting devices as applied to the marine, ocean research, and commercial fishing industries utilize locking and releasing methods such as sliding load supports, spring-loaded pins, pivoted latches, swivel locking arms, trip levers, and, as disclosed in U.S. Pat. No. 4,813,731 issued to Smith on Apr. 21, 1989, which is directed to a pelican hook, and in U.S. Pat. Nos. 3,934,933; 3,979,803; and 4,850,254. These and similar methods have addressed the functional locking and releasing means for light to moderate tensile loads. Unfortunately, when such methods are used with heavy tensile loads, the release mechanisms absorb an excessive amount of the tensile load, resulting in increased friction on the mechanisms that requires an inordinate amount of force by the user to unlatch or release the mechanism and also resulting in premature fatigue of the mechanisms, which compromises the safety and locking security.

In order to transfer a high-tensile load from the release mechanism to the connecting body of the device and still providing releasability and locking security, devices such as that taught by Smith provide compound release mechanisms to dissipate the tensile load. This results in complex and bulky devices not easily handled and costly to manufacture.

The increased concern regarding safety at sea has alerted users of leverage-type release devices, such as pelican hooks, to search for safer alternative release mechanisms. Pelican hooks are generally used in conditions where the tensile load upon them exceeds their intended capacity and the user is given to using a hammer to dislodge the release apparatus, which is located dangerously close to the hook retaining the connecting link.

Ocean research requires that loads, i.e., anchors, surveying or monitoring equipment, etc., be dropped into the ocean from a deck-mounted crane. As this activity often occurs during inclement weather, safety is of the greatest concern. A release mechanism is preferred that provides multi-directional releasability from a single point on the device. This enables a user to quickly and safely select different methods of releasing the load, depending on the sea conditions at the time. One method of release is by pulling on the release lanyard manually, and the other method is attaching the release lanyard to the crane boom and lowering the load with the crane's winch to thereby cause release of the load. The latter method is the safest because in the manual method rotation of the load prior to its release does not prevent the release lanyard from becoming wrapped around the device and either causing inadvertent release or failure to release when desired.

The device disclosed by the inventor in his U.S. Pat. No. 5,100,192, issued on Mar. 31, 1992, offers an improvement over non-toggle linkage release mechanisms, but it does not provide multi-directional releasability from a single point on the device.

During the course of releasing a load under tension, there is often a delay time between applying the tensile load to the release mechanism and the actual release of the load. This requires safety measures, such as providing means to securely lock the release device and thereby prevent inadvertent release of the load.

Thus, devices, such as the inventor's device disclosed in the foregoing patent and also disclosed in the inventory's U.S. Pat. No. 5,123,374, provide a releasing mechanism that secures the connecting member but does not provide a means to securely lock the device in that position to prevent inadvertent release of the load.

In the case of toggle linkage release mechanisms, the ability to release a load under tension with the least degree of effort requires that the body and the releasing portion of the device equally share the load to be released. Devices, such as those disclosed by the inventor in his previous patents, teach the tensile loads on the device acting off-center or on different planes so as to unnecessarily increase the tensile load to the movable portion of the device and, thus, cause additional wear to the releasing mechanism, additional shock to the releasing mechanism, and requiring additional effort to release the device. Finally, another desirable feature is a release mechanism that dampens shock without requiring the use of additional levers and springs, such as those disclosed in the inventor's prior patents.

SUMMARY OF THE INVENTION

The present invention is directed to a releasable hook for use with a high-tensile load-bearing object that includes a frame with a fixed jaw member for connecting high-tensile loads to an object, a movable jaw member rotatably mounted on the frame to move between a first position, wherein the movable jaw member is engaged with a load-bearing object, and a second position, wherein the movable jaw member is disengaged from a load-bearing object; a releasable locking mechanism that comprises a handle pivotally mounted to the frame to pivot about a first axis and move between a first position and a second position, and a floating link having a first end mounted on the movable jaw member to pivot about a second axis and a second end mounted on the handle to pivot about a third axis. As such, movement of the handle towards the first position moves the third axis of the floating link into alignment with the first and second axes to thereby move the movable jaw member to the first position, and movement of the handle to the second position moves the third axis of the floating link out of alignment with the first and second axes to thereby move the movable jaw member into the second position.

In accordance with another aspect of the present invention, the third axis is positioned between the first and second axes when the handle is moved to the first position.

In accordance with another aspect of the present invention, the third pivot axis is preferably positioned slightly out of alignment with the first and second axes such that tension on the movable jaw member urges the handle to remain in the first position.

In accordance with still yet another aspect of the present invention, the device further includes a locking mechanism to prevent inadvertent movement of the handle from the first position to the second position. In addition, the device also includes a shock dampening component that reduces shock to the handle as it moves from the first to the second position.

As will be readily appreciated from the foregoing description, the present invention provides a lighter, more compact and more easily manufactured locking and releasing mechanism for use in the marine and other industries. This mechanism more evenly distributes the tensile load between the fixed jaw member and the movable jaw member to reduce wear and stress on the movable mechanisms. In addition, it facilitates multi-directional releasability from a single point on the device. Finally, it enhances the reliability of the device by dampening shock to the handle as the handle is moved to release the load and enables locking of the device for security.

BRIEF DESCRIPTION OF THE DRAWINGS

The foregoing and other features and advantages of the present invention will be more readily appreciated as the same becomes better understood from the following detailed description when taken in conjunction with the accompanying drawings, WHEREIN.

DETAILED DESCRIPTION

Figure 1:
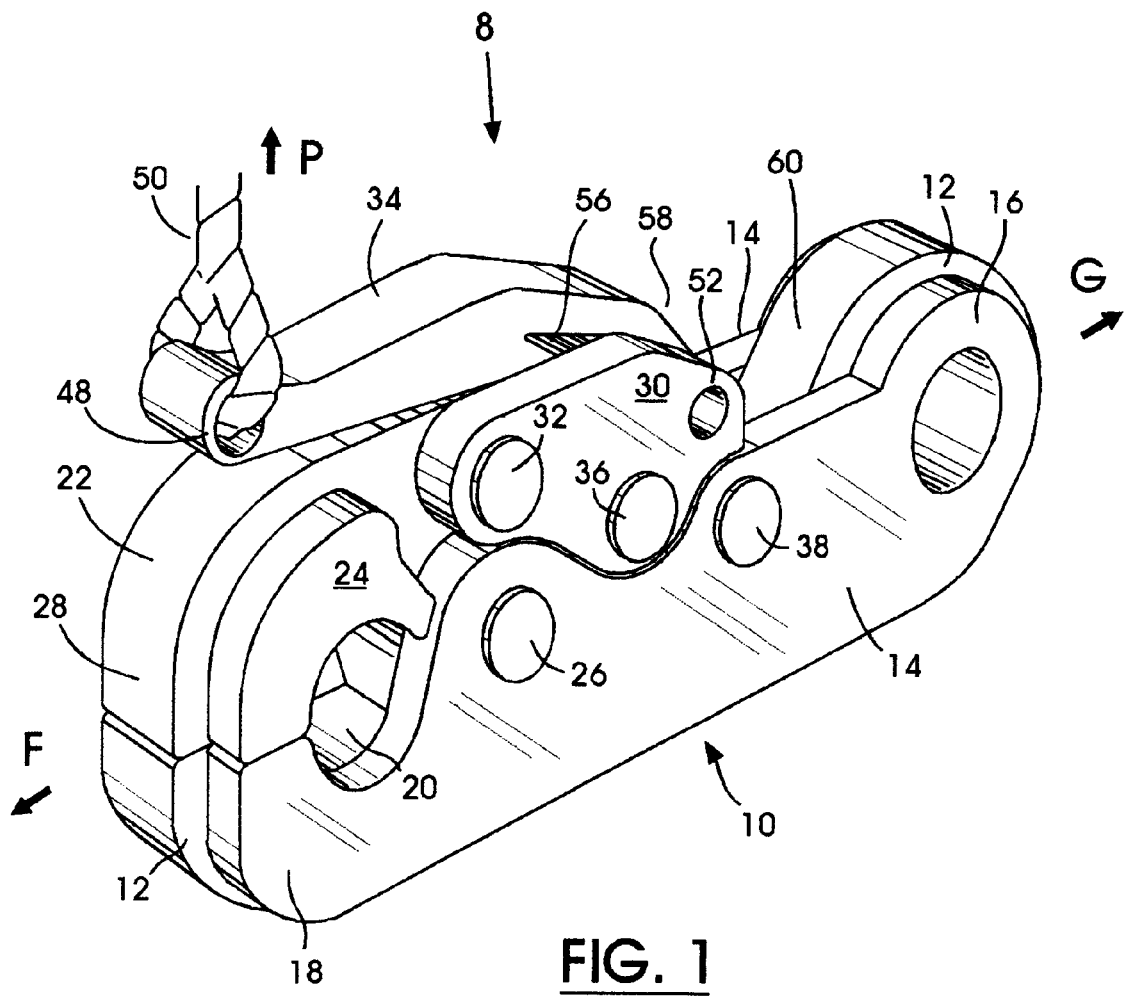
FIG. 1 is a perspective view of a representative embodiment of the toggle locking release mechanism formed in accordance with the present invention.
Figure 2:
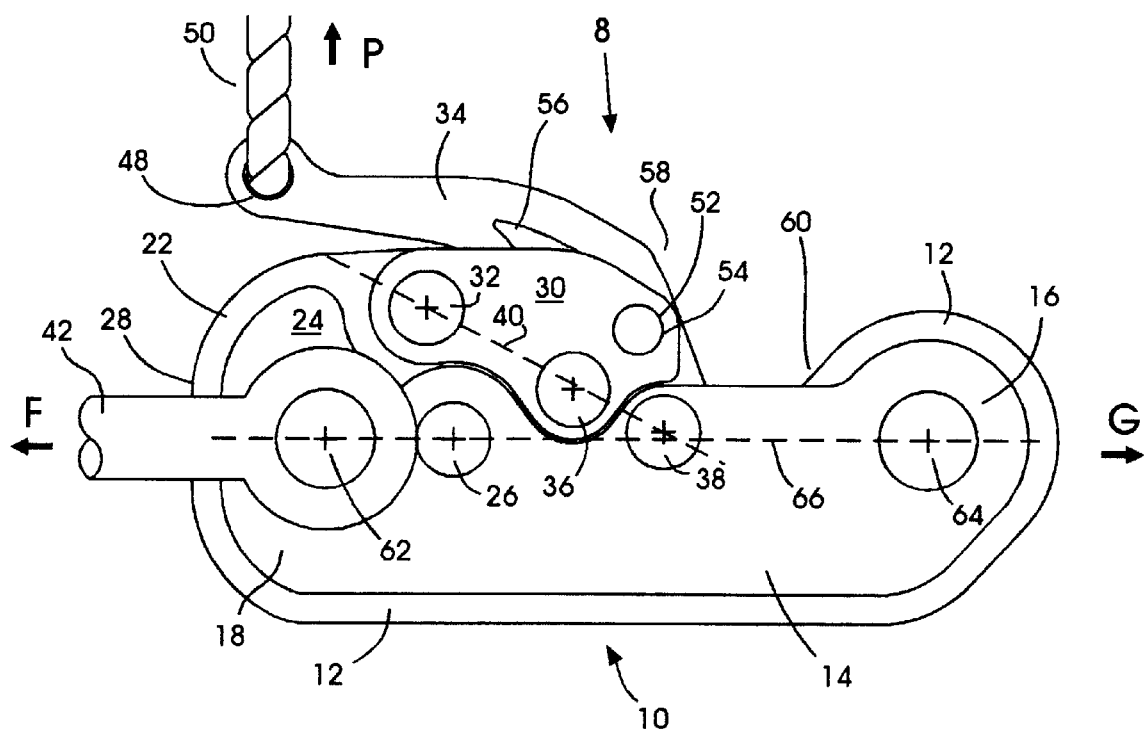
FIG. 2 is a plan view of the device of FIG. 1 continuing in the locked position.
Figure 3:
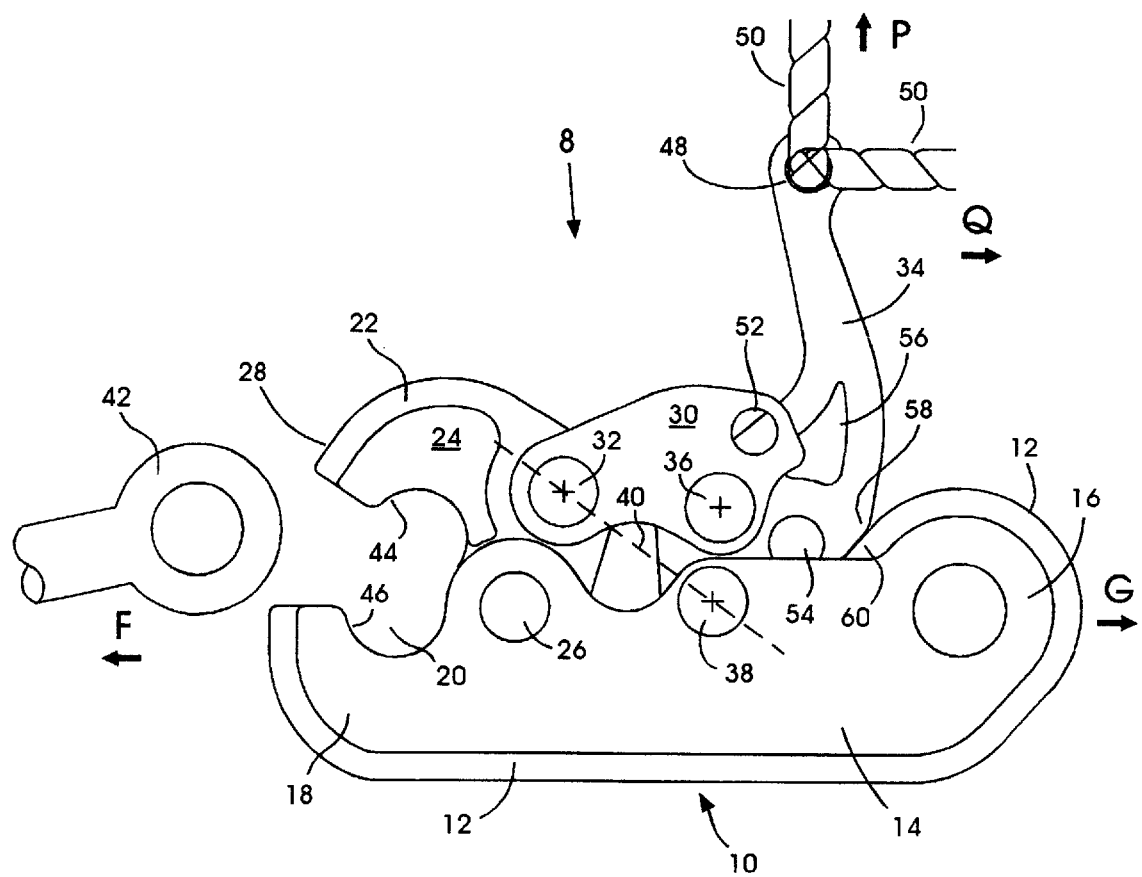
FIG. 3 is a plan view of the device of FIG. 1 in a released position.

Referring to FIGS. 1–3, a representative embodiment of a toggle locking release mechanism 8 formed in accordance with the present invention is illustrated therein. Ideally, the mechanism 8 is constructed of corrosion-resistant material, such as stainless steel plate. A three-piece connecting body 10 consists of a central plate 12 that is sandwiched between two side plates 14, either by welding, bolting, or other conventional method of attachment. Formed on one end of the mechanism 8 is a closed eye 16 and at the other end of the mechanism 8 a fixed jaw 18. The fixed jaw 18 has a biased inner surface 46 that defines one side of a catchment recess 20 for receiving a connecting member 42, which is shown in this case to be a shackle. It is to be understood, however, that a chain link, ring, or other suitable connecting member may be used at either end of the connecting body 10.

An opposing pivoted jaw 22 having a biased inner surface 44 that defines the other side of the catchment recess 20 is pivotally carried by the body 10 at a fixed pivot 26 mounted on the side plates 14. This is shown as a stainless steel pin, but it is to be understood that a bolt, nut, or any other suitable axle member may be used at this and other pivot points in the mechanism 8.

The opposing pivoted jaw 22 is pivotally mounted on the body 10 to rotate about the axis of the pivot 26 by a moveable pivot 32 to thereby enable movement of the pivoted jaw 22 between the locked position shown in FIGS. 1 and 2, in which the outer limb 28 adjoins the fixed jaw 18 securely bridging the catchment recess 20, and the released position illustrated in FIG. 3, in which the outer limb 28 is drawn away from the fixed jaw 18, thus opening the catchment recess 20 and allowing free release of the connecting member 42. The opposing pivoted jaw 22 is shown sandwiched between two stiffening side plates 24 that are welded or otherwise attached to the jaw 22 by conventional means.

A pair of floating links or moveable lock/release links 30 have one end pivoted to and on each side of the opposing pivoted jaw 22 at the moveable pivot 32, and they are pivotally carried by a moveable toggle pivot 36 at the other end to pivot about the axis of the pivots 32 and 36 between the locked position shown in FIGS. 1 and 2 (showing the links 30 drawn toward the body 10) and the released position illustrated in FIG. 3 (showing the links 30 extended away from the body 10).

A moveable toggle link/release lever 34 is pivotally carried by the body 10 at a fixed toggle pivot 38 to pivot about the axis of the pivot 38 between the locked position shown in FIGS. 1 and 2 (showing the lever 34 drawn toward the body 10) and the released position illustrated in FIG. 3 (showing the lever 34 extended away from the body 10).

A pulling force exerted in the direction of the arrow P is connectable at the closed eye 48 formed at the outward end of the lever 34, thus urging the lever 34 toward and into the released position illustrated in FIGS. 1–3, whereby the closed eye 48 is adapted to receive a remote release line 50 or other suitable connector. Alternatively, the angle of the lever 34 in the locked position, shown in FIGS. 1 and 2, relative to the body 10 of the mechanism 8, enables a pulling force to be exerted in the direction of the arrow Q (more or less perpendicular to the direction of the arrow P), connectable at the same closed eye that is formed at the outward end of the lever 34, thus urging the lever toward and into the released position illustrated in FIG. 3. Consequently, the user is provided with means to release the mechanism 8 by exerting a pulling force in the direction of arrow P, or by exerting a pulling force in the direction of arrow Q, enabling use of the same remote release line 50 connected to a single point (the closed eye 48) on the lever 34.

The outward end of the link 30 is provided with an aperture 52 that is formed to align with an aperture 54 formed in the lever 34 when the mechanism 8 is in the locked position, as shown in FIGS. 1 and 2. When aligned, the aperture 52 and the aperture 54 form a single opening adapted to receive a locking pin, such as a stainless steel hitch pin or other suitable locking member, so as to securely lock the mechanism 8 in the locked position and prevent inadvertent release of a load.

The central portion of the lever 34 is provided with a triangular aperture 56 that is also formed to reduce the weight of the lever 34 and adapted to provide shock absorption to the lever 34. An impact surface 58 on the lever 34 contacts and impact surface 60 formed on the upper portion of the closed eye 16 when the lever 34 is fully extended outward in the release position, as is illustrated in FIG. 3.

A stress reducing feature is also provided in the mechanism 8 by the alignment of three load-bearing points along the same plane or centerline 66, as is illustrated in FIG. 2. These points include the axis 62 of the connecting member 42, the axis 63 of the fixed pivot 26, and the axis 64 of the closed eye 16. Thus, the load of tensile force vector (F) opposing vector (G) is shared equally by the fixed jaw 18 and the opposing pivoted jaw 22, preventing unnecessary loading of the releasing means and the resultant shock damage to the releasing means, and reducing the effort to release the mechanism 8.

In operation, the toggle locking release mechanism 8 of the present invention utilizes a 3-piece connecting body 10 that links the opposing tensile force vectors (F) and (G). The closed eye 16 on the one end of the body 10 is adapted to be connected to an outside structural member (not shown). The fixed jaw 18 at the other end in combination with the opposing pivoted jaw 22 defines a catchment recess 20. The opposing pivoted jaw 22 is pivotally carried at the fixed pivot 26 to pivot between the locked position (shown in FIGS. 1 and 2), in which the outer limb 28 adjoins the fixed jaw 18 to securely bridge the catchment recess 20 and hold the connecting member 42, and the released position (shown in FIG. 3), in which the outer limb 28 is drawn away from the fixed jaw 18 to open the catchment recess 20, thus enabling free release of the connecting member 42. The floating links or movable lock/links 30 pivot about both axes between the locked position, where they are drawn down toward the body 10 to secure the connecting member 42, and the released position, wherein they are extended away from the body 10 to thus open the opposing pivoted jaw 22 and the catchment release 20, enabling release of the connecting member 42.

The movable toggle link/release lever 34 pivots on the body 10 at the fixed toggle pivot 38 to thereby move the movable lock/release links 30 about the movable toggle pivot 36 between the locked position, wherein the lever 34 is drawn down toward the body, and the released position shown in FIG. 3, wherein the lever 34 is extended away from the body 10. The lever 34 is constructed such that its pivotal movement in relation to the movable lock/links 30 and the pivoted jaw 22 enables the axis of the toggle pivot 36 to cross an over-center line 40 that connects the axes of the pivots 38 and 32. Thus, in the locked position, a secure closure of the catchment recess 20 is formed just after the axis of the pivot 36 has crossed the line 40 to the locking side of the line 40. Similarly, in the released position shown in FIG. 3, the catchment recess is open to just after the axis of the pivot 36 has crossed the line 40 to the releasing side of line 40, thereby releasing the member 42. The outward end of the lever 34 provides a leverage arm, the length of which is sufficient to manually release the mechanism 8 when under tensile load.

In the locked position illustrated in FIGS. 1 and 2, the relationship of the lever 34, the links 30, and the body 10 is such that no further movement of the links 30 will occur. Any increase to tension applied in the direction of the force vector (F) and (G) to the connecting member 42 and partially applied to the pivoted jaw 22 will further tool block or lock up all the moving parts of the mechanism 8 to provide a secure locking connection.

As the lever 34 causes the movable toggle pivot 36 to undergo over-center movement to the releasing side of the line 40, tension applied at the force vectors (F) and (G) by the member 42 to the biased inside surface 36 of the fixed jaw 22 will then urge further releasing movement to all working parts of the mechanism 8. The biased inside surfaces 44 and 46 are formed so that tension at force vector (F) applied to the member 42 is equally distributed between the body 10 and the pivoted jaw 22, thereby reducing undue stress and friction to the moving parts of the mechanism 8 and facilitating ease in releasing the mechanism 8 when under tensile load.

Additional stress to the releasing parts of the mechanism 8 is reduced by the alignment of the three load-bearing points along the lines 66, namely the axes 62, 63, and 64 as shown in FIG. 2.

The foregoing description illustrates a number of advantages evident in the toggle locking release mechanism of the present invention, including having multi-directional releasability by one release lanyard connected to a single point on the handle; means to increase security of the device in the locked position with a stainless steel pin to prevent inadvertent release; integrated shock-dampening means without the need for additional springs or parts; increased structural strength with the use of plate steel rather than cast materials; and having an equal distribution of tensile load applied to the body and the working parts of the device by means of alignment of the load-bearing points on the mechanism.

It must be understood that while a preferred representative embodiment of the present invention has been described herein, changes may be made in the shape, size, and configuration without departing from the spirit and scope of invention. For instance, the outer limb 28 of the pivoted jaw 22 and the recess 20 of the fixed jaw 18 may be formed to have grooves such that when the pivoted jaw 22 and the fixed jaw 18 are in the locked position, they will grip a cable. Consequently, the invention is to be limited only by the scope of the claims that follow.

The embodiments of the invention in which an exclusive property or privilege is claimed are defined as follows:

1. A releasable hook for use with high-tensile load-bearing objects, comprising:

(a) a frame adaptable for connecting high-tensile loads to an object, said frame including a securing member at one end and a fixed jaw member at an opposite end:

(b) a hook member pivotally mounted on said frame to move between a first position, wherein said hook member is in contact with said fixed jaw member on said frame and engageable with load-bearing objects, and said hook member and said fixed jaw member being sized and shaped such that loads will bear substantially equally on said hook member and said fixed jaw member, and a second position, wherein said hook member is disengageable from load-bearing objects;

(c) means for releasably locking said hook member in said first position, comprising:

(i) a handle pivotally mounted on said frame to pivot about a first axis and move between a first position and a second position, said handle having a free end with an opening formed therein to enable attachment of ropes, chains, or cables; and (ii) a floating link having a first end mounted on said hook member to pivot about a second axis and a second end mounted on said handle to pivot about a third axis, such that movement of said floating link moves said third axis into alignment with said first axis and said second axis to thereby move said hook member to said first position, and movement of said handle to said second position moves said third axis of said floating link out of alignment with said first axis and said second axis to thereby move said hook member into said second position; and (d) means for dampening shock as said handle moves from said first position to said second position; said shock dampening means comprising a triangular opening formed in said handle between said third axis and said opening in said free end to reduce the weight of said handle and enable said handle to flex under initial load when said hook member moves into said first position.

2. The releasable hook of claim 1, wherein said third axis is positioned between said first axis and said second axis when said handle is moved to said first position.

3. The releasable hook of claim 1, wherein said third pivot axis is slightly out of alignment with said first axis and said second axis such that said third pivot axis is in an over-center position when said hook member is moved to said first position so that said hook member bears against said fixed jaw member when said third axis is in the over-center position to thereby exert tension on said hook member.

4. A toggle-locking release mechanism, comprising:
(a) a connecting body for linking opposing loads that includes a securing means on a securing end of said body and a fixed jaw on an opposing end of said body, said fixed jaw having an inside surface to define one side of a catchment recess;
(b) an opposing jaw member having an inside surface that defines the other side of said catchment recess, said jaw member being pivotally carried by said body at a fixed jaw pin; said jaw member being movable between a locked position and a released position, wherein as said jaw member is moved toward and into the locked position, said jaw member is in adjoinment with said fixed jaw and forms a secure closure of said recess to thereby secure one or more load-bearing objects within said recess and share the load substantially equally between said fixed jaw and said jaw member, and further wherein as said jaw member is moved toward and into the released position to extend from said body, an opening in said recess is formed to thereby enable release of objects; and
(c) a linking member having one end pivotally mounted on said jaw member by a movable pivot pin, and a second end mounted on a lever by a movable toggle pivot pin, said linking member being movable between a locked position and a released position, wherein as said linking member is moved towards said body and into the locked position, said jaw member is moved by said linking member into the locked position, and further wherein as said linking member is moved into the released position such that said linking member is extended away from said body, said jaw member is moved by said linking member into the released position to open said recess;
(d) said lever having an outward end with an opening to enable attachment of ropes, chains, or cables, and an inward end pivotally attached to said body at a fixed pivot pin and an intermediate portion pivotally attached to said linking member at said movable toggle pivot pin, said lever being movable between a locked position and a released position and adapted in relation to said linking member whereby pivotal movement causes the axis of said movable toggle pivot pin to cross an over-center line connecting the axes of said fixed pivot pin and said movable pivot pin, wherein as said linking member is moved by said lever toward and into the locked position, said jaw member bears against said fixed jaw and tension is exerted on said jaw member and a secure closure of said recess is formed immediately after the axis of said movable pivot pin has crossed said over-center line to thereby urge said linking member and said lever into their locked positions, and further wherein as said linking member is moved by said lever toward and into said released position, an opening of said recess is formed immediately after the axis of said movable toggle pivot pin has crossed the over-center line to the releasing side of the center line, the locked position and the released position of said lever being adapted in relation to said body whereby pivotal movement of said lever from the locked position to said released position is attainable by a pulling force acting on said outward end of said lever in either of two directions, a first direction being toward said securing end of said body and a second direction that is substantially perpendicular to said first direction; and
(e) means for locking and preventing inadvertent release of said jaw member, said locking means further including means for dampening shock to said lever.

5. A releasable hook for use with high-tensile load-bearing objects comprising:
(a) an elongate frame having a longitudinal axis and adaptable for connecting high-tensile loads to an object, said elongate frame including a first end having a fixed jaw member and a second end with a transverse opening formed therein having a transverse axis;
(b) a hook pivotally mounted on said frame to rotate about a pivot pin and thereby move between a first position, wherein said hook is in contact at a contact point with said fixed jaw member on said frame and defines an enclosed recess having a transverse axis and that is engageable with load-bearing objects, and said hook and said fixed jaw member being sized and shaped so that said contact point, said transverse axis of said enclosed recess, and said transverse axis of said transverse opening are positioned along a common line that intersects an axis of said pivot pin, whereby loads will bear substantially equally on said hook and said fixed jaw member, and a second position, wherein said hook moves out of contact with and away from said fixed jaw member; and
(c) means for releasably locking said hook into said first position comprising:
(i) a handle pivotally mounted on said frame to pivot about a first axis and move between a first position towards said first end of said frame and a second position towards said second end of said frame, said handle having a free end with an opening formed therein to provide a single attachment point for a rope, chain, or cables; and
(ii) a floating link having a first end mounted on said hook to pivot about a second axis and a second end mounted on said handle to pivot about a third axis, such that movement of said handle towards said first position moves said third axis of said floating link into alignment with said first axis and said second axis to thereby move said hook to said first position, and movement of said handle to said second position moves said third axis of said floating link out of alignment with said first axis and said second axis to thereby move said hook into said second position.

6. The releasable hook of claim 5, wherein said third pivot axis is slightly out of alignment with said first axis and said second axis, such that said third pivot axis is in an over-center position when said hook is moved to said first position, and said hook bears against said fixed jaw member when said third axis is in the over-center position to thereby exert tension on said hook so that tension on said hook urges said hook to remain in said first position.

7. The releasable hook of claim 6, further comprising means for dampening shock as said handle moves from said first position to said second position; said shock dampening means comprising a triangular opening formed in said handle between said third axis and said opening in said free end of said handle to reduce the weight of said handle and to enable said handle to flex under initial load when said hook moves into said first position.

8. A toggle-locking release mechanism comprising:
(a) a connecting body for linking opposing tensile loads vectors that includes a securing means on a securing end of said body and a fixed jaw on an opposing end of said body, said fixed jaw having an inside surface to define one side of a catchment recess;
(b) an opposing jaw member having an inside surface that defines the other side of said catchment recess, said jaw member being pivotally carried by said body at a fixed jaw pin; said jaw member being movable between a locked position and a released position, wherein as said jaw member is moved toward and into the locked position, said jaw member is in adjoinment with said fixed jaw and forms a secure closure of said recess to thereby secure one or more load-bearing objects within said recess and share the load substantially equally between said fixed jaw and said jaw member, and further wherein as said jaw member is moved toward and into the released position to extend from said body an opening in said recess is formed to thereby enable release of objects; and (c) at least one link having one end pivotally mounted on said jaw member by a movable pivot pin, and a second end mounted on a lever by a movable toggle pivot pin, said at least one link being movable between a locked position and a released position, wherein as said at least one link is moved towards said body and into the locked position, said jaw member is moved by said at least one link into the locked position, and further wherein as said at least one link is moved into the released position such that said at least one link is extended away from said body, said jaw member is moved by said at least one link into the released position to open said recess;

(d) said lever having an inward end pivotally attached to said body at a fixed pivot pin and an outward end pivotally attached to said at least one link at said movable toggle pivot pin said outward end having an opening to provide a single attachment point for a rope, chain, or cables, said lever being movable between a locked position and a released position and adapted in relation to said at least one link whereby pivotal movement causes the axis of said movable toggle pivot pin to cross an over-center line connecting the axes of said fixed pivot pin and said movable pivot pin, wherein as said at least one link is moved by said lever toward and into the locked position, said jaw member bears against said fixed jaw and tension is exerted on said jaw member and a secure closure of said recess is formed therein immediately after the axis of said movable pivot pin has crossed said over-center line to thereby urge said at least one link and said lever into their locked positions, and further wherein as said at least one link is moved by said lever toward and into said released position, an opening of said recess is formed without substantial effort by the user immediately after the axis of said movable toggle pivot pin has crossed the over-center line to the releasing side of the center line, the locked position and the released position of said lever being adapted in relation to said body whereby pivotal movement of said lever from the locked position to said released position is attainable by a pulling force acting on said outward end of said lever in either of two directions, a first direction being toward said securing end of said body and a second direction that is substantially perpendicular to said first direction.

9. The mechanism of claim 8, further comprising means for locking said jaw member to preventing inadvertent release of said jaw member, said locking means including at least one opening in said link and a corresponding aperture said lever and a means for preventing relative movement of said at least one link and said lever by insertion of said preventing means into said at least one opening and said aperture, said locking means further including means for dampening shock to said lever.

* * * * *